(12) United States Patent
Nagasaka et al.

(10) Patent No.: US 8,036,395 B2
(45) Date of Patent: Oct. 11, 2011

(54) SOUND EFFECTS GENERATION DEVICE, SOUND EFFECTS GENERATION METHOD, AND COMPUTER PROGRAM PRODUCT

(75) Inventors: Kenichiro Nagasaka, Tokyo (JP); Masakuni Nagano, Tokyo (JP)

(73) Assignee: Sony Corporation, Tokyo (JP)

( * ) Notice: Subject to any disclaimer, the term of this patent is extended or adjusted under 35 U.S.C. 154(b) by 1310 days.

(21) Appl. No.: 11/634,989

(22) Filed: Dec. 7, 2006

(65) Prior Publication Data

US 2007/0196801 A1 Aug. 23, 2007

(30) Foreign Application Priority Data

Dec. 9, 2005 (JP) ................................. 2005-356846

(51) Int. Cl.
*H03G 3/00* (2006.01)
(52) U.S. Cl. ................ 381/61; 381/62; 381/64; 463/30; 463/35; 715/701; 715/702
(58) Field of Classification Search ............. 381/61–63, 381/64; 463/30–31, 2, 33, 35; 715/701–702
See application file for complete search history.

(56) References Cited

U.S. PATENT DOCUMENTS

| 6,760,050 B1 * | 7/2004 | Nakagawa | 715/848 |
| 2003/0162592 A1 * | 8/2003 | Takahashi | 463/33 |
| 2004/0002380 A1 * | 1/2004 | Brosnan et al. | 463/32 |

FOREIGN PATENT DOCUMENTS

| JP | 3-44375 | 2/1991 |
| JP | 2000-197768 | 7/2000 |
| JP | 2001-256510 | 9/2001 |
| JP | 2004-252756 | 9/2004 |
| JP | 2005-134885 | 5/2005 |

OTHER PUBLICATIONS

Communication from Japanese Patent Office in application No. 2005-356846, issued Feb. 1, 2011 (2 pages).

* cited by examiner

*Primary Examiner* — Devona Faulk
*Assistant Examiner* — Disler Paul
(74) *Attorney, Agent, or Firm* — Finnegan, Henderson, Farabow, Garrett & Dunner, L.L.P.

(57) ABSTRACT

A sound effect generation device for generating a sound effect corresponding to a physical interaction between objects in a virtual space in which a plurality of virtual objects coexists, includes interaction detection means for detecting an object on which the physical interaction occurs in the virtual space, mechanical quantity calculation means for calculating mechanical quantity acting on the object in accordance with the interaction using a mechanical model for determining, based on physics, behavior between the objects on which the physical interaction acts, and sound effect generation means for generating the sound effect caused in the object by the interaction using the calculated mechanical quantity.

13 Claims, 6 Drawing Sheets

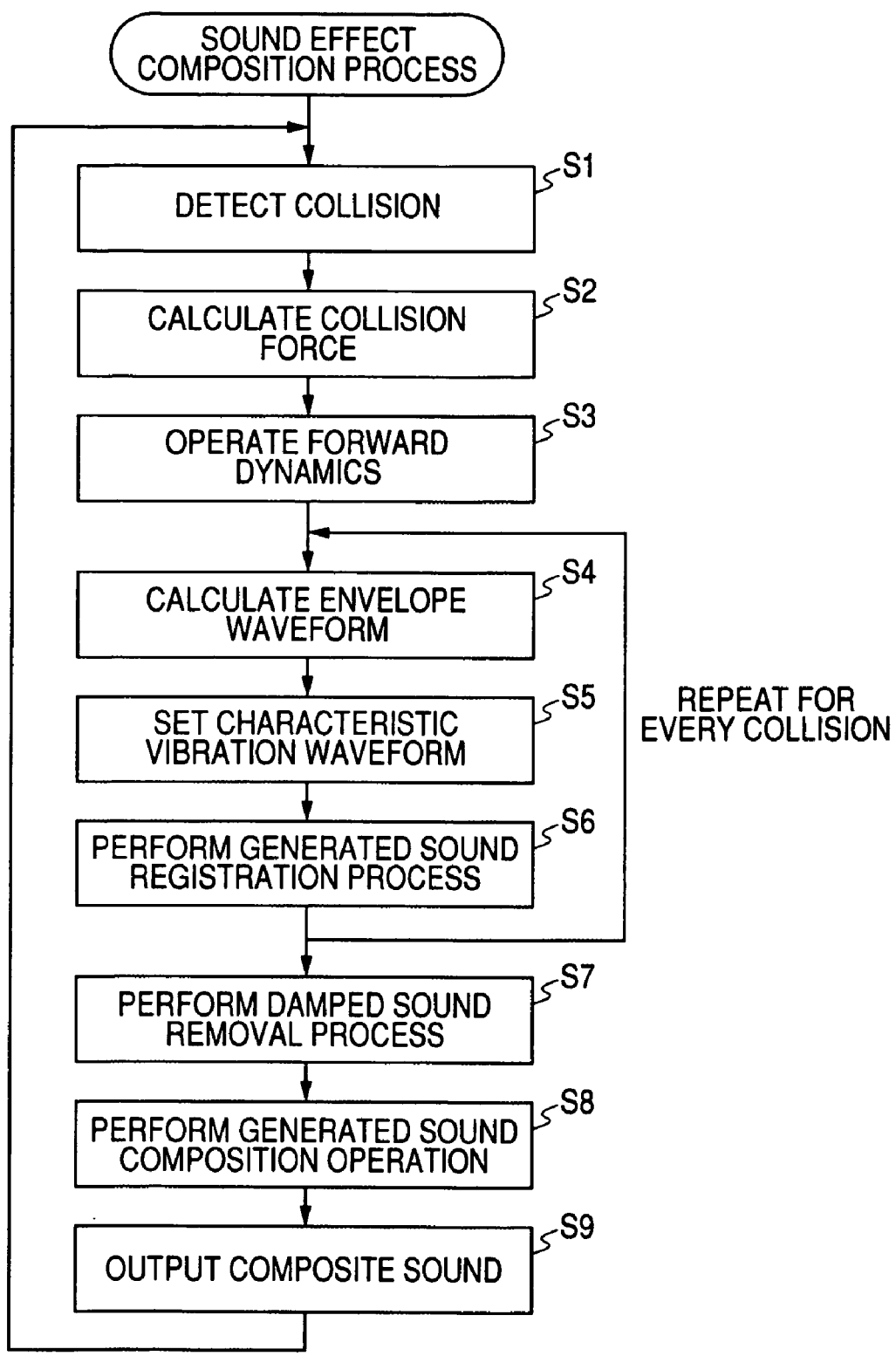

SOUND EFFECTS GENERATION DEVICE, SOUND EFFECTS GENERATION METHOD, AND COMPUTER PROGRAM PRODUCT

CROSS REFERENCES TO RELATED APPLICATIONS

The present invention contains subject matter related to Japanese Patent Application JP 2005-356846 filed in the Japan Patent Office on Dec. 9, 2005, the entire contents of which being incorporated herein by reference.

BACKGROUND OF THE INVENTION

1. Technical Field

The present invention relates to a sound effects generation device, a sound effects generation method, and computer program product for generating sound effects for the case in which an interaction between objects such collision or contact occurs in a three-dimensional virtual space, and in particular to a sound effects generation device, a sound effects generation method, and computer program product for generating sound effects with reality for the case in which an interaction between virtual objects occurs while keeping real-time property required in a VR system.

2. Related Art

In a three-dimensional graphics technology, a three-dimensional body is treated as an aggregate of an infinitely large number of polygons, namely an approximate mathematical model, a texture expressing material quality is mapped onto the surface thereof, and further, a light source calculation is performed to provide the texture with shadings and thickness, thereby making it possible to generate a realistic three-dimensional high-resolution image.

Further, development of computer animation for automatically generating an animation of a three-dimensional body on a computer by applying morphing or other methods is actively conducted. In recent days, according to progress in the rendering technology, the reality of the computer animation has been dramatically improved, and accordingly, the computer animation is applied to various fields utilizing virtual reality (VR) such as a computer game.

The reality of the computer animation in a drawing aspect increases, whereas room is left for enhancement of reality with respect to other aspects such as a motion or a tactile impression of the body, or sound. Further, problems in the VR system are speeding up of the process and a method of applying to the system, and in the problems an important factor is simultaneous pursuit of the real-time property and the high quality image.

The present specification particularly handles a method of artificially composing sound effects for the case in which an interaction such as a collision or a contact between objects occurs to enhance reality and presence of computer animations.

Regarding the computer-aided automatic sound generation, for example, a proposal is presented for a music synthesizer for simulating sound generation structures of various natural instruments to synthesize music waveforms (see, for example, JP-A-9-305177 (Japanese Patent No. 3044375)). In this device, a drive signal for a physical model sound source is generated using an excitation envelope signal generated by an envelope signal generation section, and an amplitude envelope is provided to the music signal using an amplitude envelope signal generated by the envelope signal generation section. Further, it is configured that a constant drive signal is input to the physical model sound source to maintain the excitation without retriggering the excitation envelope even in the case in which retriggering of the amplitude envelope is performed, thereby making it possible for a person like a beginner to easily perform sound generation/performance control, and also making it possible to realize a performance like crescendoing every note without causing any delay in sound generation. However, although this device can automatically generate sound close to that of a natural instrument, it dose not answer the question of what kind of sound should be provided to the interaction such as a collision or a contact between objects on the three-dimensional virtual space.

Still further, a proposal is presented for a three-dimensional object presentation device for feeding back sound generated when scratching or hitting a physical object in response to an interactive command input from the user via a three-dimensional viewer (see, for example, JP-A-2001-256510). However, the present device attaches sound generated when scratching or hitting an original object described as three-dimensional model data to the three-dimensional model data, and only reproduces it in accordance with an instruction of the user, but dose not generate sound corresponding to the mechanical quantity such as the degree of the impact of the collision or the counterpart of the collision. Therefore, if it is applied to a VR system, the sound lacks reality.

Further, a proposal is also presented for a body interference representation device for representing the degree of interference between a plurality of bodies with an impact noise (see, for example, JP-A-2004-252756). However, the present device has previously stored impact noise data in the case in which bodies made of the same materials, for example, collide with each other separated into cases corresponding large impact, middle impact, and small impact of the collision, respectively, and directly reproduces to output either one of the impact noise data in accordance with the degree of the impact resulted in an impact deformation analysis simulation. Therefore, although the user can auditorily recognize the degree of the interference between the bodies, it seems that sufficient reality cannot be provided because the sound lacks elaboration.

A composition method of a sound source currently adopted in a VR system basically depends on a simple method of reproducing previously sampled sound, which cannot compose sound with reality supported by the physical model.

Incidentally, in the system applying the three-dimensional virtual space, real-time processing is important. In anapplicationsuchasa computergame, the case in which a large number of objects cause interactions at the same time can be assumed, and in such a case, an excessively precise physical model makes the real-time processing difficult. In other words, a sound effect generation algorism, which is simple, but has a great advantage in creating reality, is desired.

SUMMARY

It is desirable to provide a sophisticated sound effect generation device, sound effect generation method, and computer program product capable of generating realistic sound effects suitable for the case in which an interaction such as a collision or a contact between objects on the three-dimensional virtual space occurs while keeping the real-time property required in a VR system.

It is further desirable to provide a sophisticated sound effect generation device, sound effect generation method, and computer program product capable of composing realistic sound effects suitable for the case in which an interaction such as a collision or a contact between objects on the three-dimensional virtual space occurs with support by the physical model.

According to an embodiment of the invention, there is provided a sound effect generation device for generating a sound effect corresponding to a physical interaction between objects in a virtual space in which a plurality of virtual objects coexists, the sound effect generation device includes interaction detection means for detecting an object on which the physical interaction occurs in the virtual space, mechanical quantity calculation means for calculating mechanical quantity acting on the object in accordance with the interaction using a mechanical model for determining, based on physics, behavior between the objects on which the physical interaction acts, and sound effect generation means for generating the sound effect caused in the object by the interaction using the calculated mechanical quantity.

In accordance with the recent progress in the information technology field, the VR systems utilizing virtual reality are applied in a wide variety of fields. The reality in the drawing aspect of the computer animation has been enhanced whereas regarding other aspects thereof such as sound effects, room is left for enhancement of reality. In the majority of systems, basically, the audio data previously recorded or generated is only reproduced to output in response to the timing when the physical interaction such as a collision between the objects occurs in the virtual space. Therefore, it seems that the sound lacks sophistication and fails to provide sufficient reality.

In contrast, according to an embodiment of the invention, it becomes possible that a collision or other physical interactions between the objects in the three-dimensional virtual space are calculated using a mechanical simulation, and a realistic and sophisticated motion or tactile impression of the body or sound effects corresponding to a collision is obtained.

An operational space is a space for describing the relationship between the force acting on the object and the acceleration caused therefrom. The relational expression between the acceleration and the force in the operational space can be described using the operational space mechanical quantity such as the inverse operational space inertia matrix or operational space bias acceleration. Further, it is possible to obtain the acceleration and the force satisfying the linear complementarity problem consisting of conditions of constraint imposed when a physical interaction such as a collision between the objects using the inverse operational space inertia matrix and operational space bias acceleration, and to determine the mechanical quantity such as the collision force acting on the object, and further the velocity, acceleration, impulse, or energy based on the obtained force.

There is a problem that the calculation of the inverse operational space inertia matrix along the definition requires a large calculation amount, and accordingly it is unsuitable for the real time property required to the VR systems. Therefore, in an embodiment of the invention, a mechanical model for determining the behavior of the object existing in the three-dimensional virtual space based on physics is used for performing the forward dynamics operation FWD for obtaining generalized acceleration from generalized force, thereby calculating the inverse operational space inertia matrix and the operational space bias acceleration at high speed.

For example, the operational space physical quantity calculation means sets the operational space in the acting direction of the vertical reacting force and the frictional force working on the virtual bodies corresponding to the physical interaction, the mechanical quantity calculation means sets the linear complementarity problem using the condition of constraint for realizing the repulsion with a designated restitution coefficient and appropriate friction force between the virtual bodies, and is capable of determining the mechanical quantity such as a collision force acting on the virtual objects when the physical interaction occurs by solving the linear complementarity problem.

Further, the operational space physical quantity calculation means sets the operational space in the direction of relative position error between the virtual bodies, the mechanical quantity calculation means sets the linear complementarity problem using the condition of constraint for positioning the virtual bodies in the designated relative positions, and by solving the linear complementarity problem, it can determine the mechanical quantity such as collision force acting on the virtual objects when the physical interaction occurs.

Further, if the virtual object on which the physical interaction acts is a link structure composed of plural rigid bodies linked one another such as a humanoid character, it is sufficient for the mechanical quantity calculation means to set the linear complementarity problem using the condition of constraint regarding the position or the posture of each link composing the link structure.

The volume of the sound is basically controlled by the envelope waveform enveloping the vibration waveform of the sound. Therefore, in the sound effect generation device according to an embodiment of the invention, it is arranged that the sound effect generation means determines the amplitude of the envelope waveform based on the mechanical quantity acting on the objects, thus the realistic sound effects having presence and physical basis can be generated. For example, if a large collision occurs, the absolute value of the amplitude of the envelope waveform becomes large.

Each of the objects is provided with the vibration attribute including the damping characteristics and the characteristic vibration waveform of the sound effects. The sound effect generation means provides the envelope waveform with the damping characteristics based on the damping characteristics inherent in each of the objects on which the physical interaction acts, and is able to calculate the sophisticated sound effect with presence by combining the envelope waveform with the characteristic vibration waveform inherent in each of the objects.

The sound in the current time can be considered as a sum of the impulse responses of all of the collisions caused in the past. Therefore, it is preferable that the generated sound list management section for registering information of each sound effect generated at every physical interaction as a past sound is provided, and a sum of the past sounds registered in the generated sound list management section is calculated on the time axis to calculate the sound on the virtual space in the current time.

Further, in fact, the volume of the impact noise reduces along the envelope waveform as the time elapses from the collision of the objects, and the impact sound becomes too soft to hear before long. Accordingly, there is no need for tracing all the past time, but it is sufficient to perform the calculation with respect to the collisions in a limited time range capable of substantially affecting the sound at present. Therefore, the generated sound list management section preferably performs a process of excluding the past sound, which is sufficiently damped, from the generated sound list.

Further, according to another embodiment of the invention, there is provided a computer program product described in a computer-readable form so that a process for generating a sound effect corresponding to a physical interaction between objects in a virtual space in which a plurality of virtual objects coexists is executed on a computer system, the computer program product allowing the computer system to execute the step of detecting an object on which the physical interaction occurs in the virtual space, the step of calculating mechanical quantity acting on the object in accordance with the interaction using a mechanical model for determining, based on physics, behavior between the objects on which the physical interaction acts, and the step of generating the sound effect caused in the object by the interaction using the calculated mechanical quantity.

The computer program according to the embodiment of the invention defines the computer program described in a computer-readable form so as to realize a predetermined process on a computer system. In other words, by installing the computer program according to this embodiment in the computer system, a cooperant action is exerted on the computer system, and the same advantage as the sound effect generation device can be obtained.

According to the embodiment of the invention, a sophisticated sound effect generation device, sound effect generation method, and computer program product capable of generating realistic sound effects suitable for the case in which an interaction such as a collision or a contact between objects on the three-dimensional virtual space occurs while keeping the real-time property required in a VR system can be provided.

Further, according to an embodiment of the invention, a sophisticated sound effect generation device, sound effect generation method, and computer program product capable of composing realistic sound effects suitable for the case in which an interaction such as a collision or a contact between objects on the three-dimensional virtual space occurs with support by the physical model can be provided.

Further, according to an embodiment of the invention, a sophisticated sound effect generating device, sound effect generating method, and a computer program products capable of enhancing reality and presence of the computer animation by artificially composing the sound effects when the interaction between the objects such as a collision or a contact occurs with the mathematical model based on physics can be provided.

In accordance with enhancement of computing power in recent years, the real time CG animation based on dynamics, in which the forward dynamics simulation is executed in the background while the three-dimensional object is driven based on the operation result, becomes more and more realistic. According to the sound effect generation method of an embodiment of the invention, based on the harmonization with the mechanical simulation, a game capable of presenting reality in motion of three-dimensional object and reality in physical interaction such as pushing or grasping can be realized. Further, according to the sound effect generating method of an embodiment of the invention, it becomes possible to generate sound effects having physical basis interactively, effectively, and in real time. Therefore, it is expected to have contribution in further enhancing the reality of the CG animation.

Other objects, features, and advantages of the invention will become apparent from the embodiments of the invention described below and further detailed explanations with reference to the accompanying drawings.

BRIEF DESCRIPTION OF THE DRAWINGS

The invention will now be described with reference to the accompanying drawings, wherein like numbers refer to like elements.

FIG. 6 is a flowchart showing a processing procedure of composing sound effects generated in accordance with a collision or a contact of objects.

DESCRIPTION OF THE EMBODIMENTS

Hereinafter, embodiments of the invention will be explained in detail with reference to the accompanying drawings.

System Configuration

Figure 1:
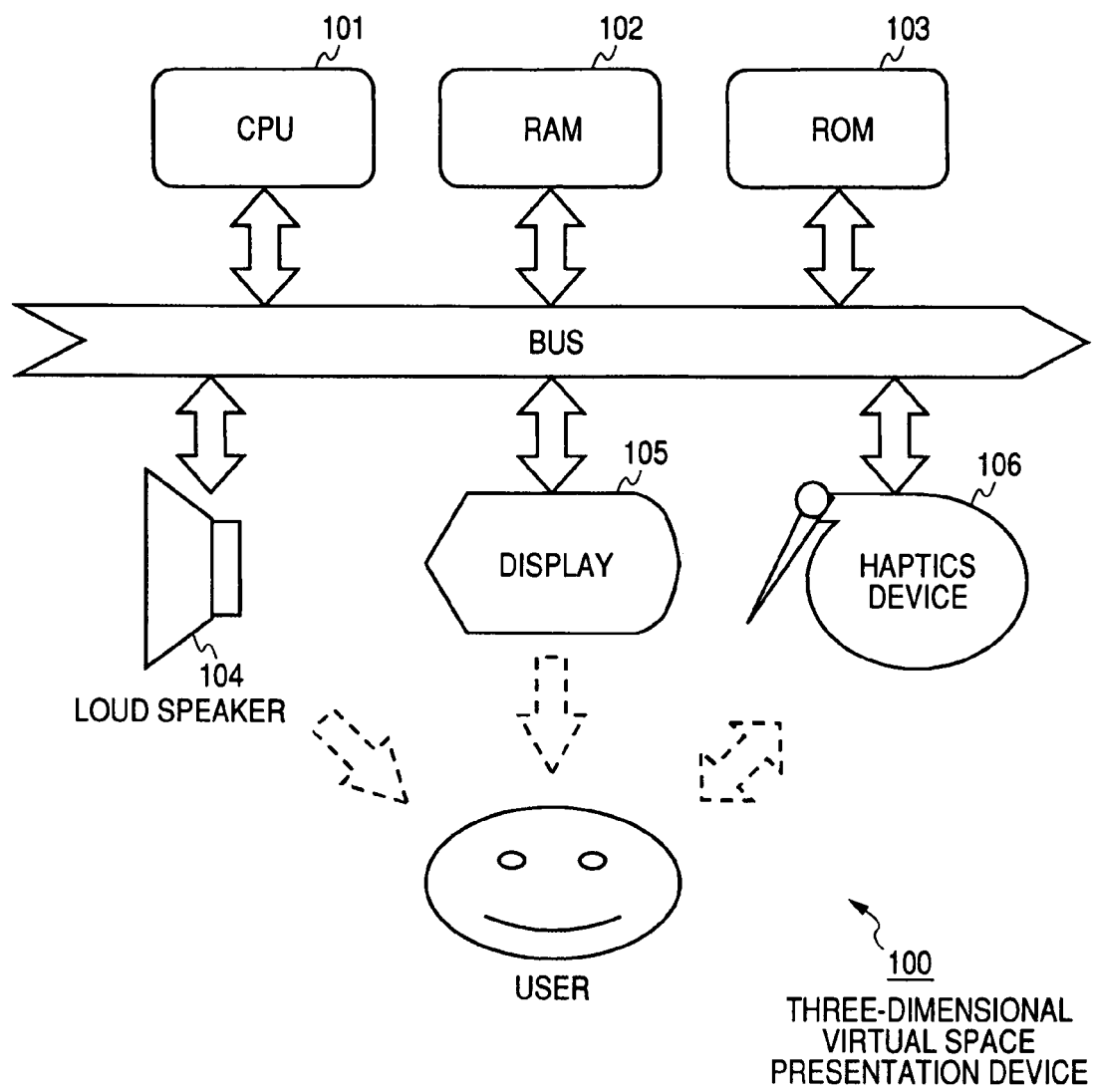
FIG. 1 is a diagram schematically shows a hardware configuration of a three-dimensional virtual space presentation device 100 according to an embodiment of the invention.

FIG. 1 schematically shows the hardware configuration of a three-dimensional virtual space presentation device 100 according to an embodiment of the invention. The present device 100 is provided with a function for presenting a condition of the three-dimensional virtual space developed on a computer to the user through a loud speaker 104, a display 105, a kinesthetic sense presentation device (a haptic device) 106.

The loud speaker 104 outputs a sound related to an event occurring in the three-dimensional virtual space, the display 105 presents visual information of the three-dimensional virtual space, and the haptic device 106 presents kinesthetic sense information sensed when touching a body in the three-dimensional virtual space. The three-dimensional virtual space presentation device 100 according to the present embodiment is capable of driving these input/output systems cooperatively to present the three-dimensional virtual space developed on the computer to the user with high reality and presence as if it were an actual space.

A CPU 101 develops a computer game or other applications stored in a ROM 103 or an external storage device in a RAM 102 and executes them to sequentially calculate temporal changes, sound information, image information, and kinetic information in the three-dimensional virtual space and write them in the RAM 102. Further, the sound information, the image information, and the kinetic information are presented to the user via the loud speaker 104, the display 105, and the haptic device 106, respectively. Still further, each of the devices 104 through 106 described above is connected to each other through a high-speed bus 107 with a transfer rate sufficient to assure the real-time property to be configured so as to be able to communicate information with each other.

The three-dimensional virtual space presentation device 100 according to the present embodiment is particularly characterized in the point of presenting the sound information in real-time and with reality of high level, and is capable of artificially composing the sound effects in the case in which an interaction between objects occurs using a mathematical model based on physics to enhance the reality and presence of the computer animation. Hereinafter, explanations will be presented with a focus on a method of calculating the sound information executed by the CPU 101.

Figure 2:
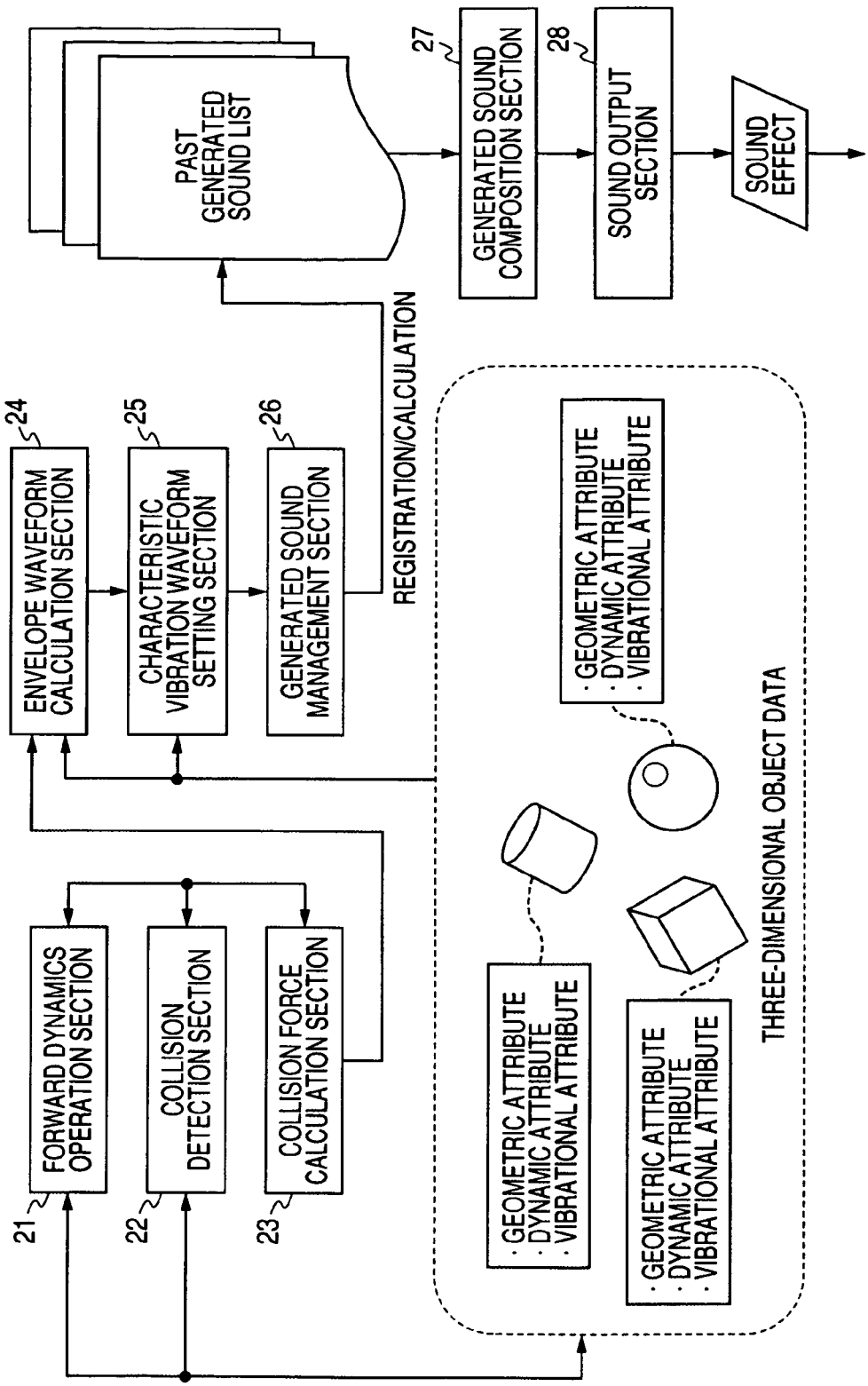
FIG. 2 is a diagram schematically showing a functional configuration of a program for calculating information regarding sound performed on a CPU 101.

FIG. 2 schematically shows a functional configuration of the program for calculating the sound information executed on the CPU 101.

The state of the three-dimensional virtual space, which is a processing object of the three-dimensional virtual space presentation device 100, is stored in the ROM 103 or the external storage device (not shown) as three-dimensional object data regarding each of the virtual objects existing in the space. It is assumed that the data regarding at least the following items is stored for every object as the three-dimensional object data, namely (1) geometric attribute such as a position, a posture, a size, or a connection, (2) dynamic attribute such as a mass, an inertia tensor, friction, or a restitution coefficient, (3) vibrational attribute mainly composed of damping characteristics and characteristic vibration waveform.

A forward dynamics operation section 21 calculates the mechanical quantity regarding the behavior of each of the objects on the three-dimensional virtual space by a forward dynamics operation (FWD) as a core operation used for a so-called mechanical simulation. Specifically, the forward dynamics operation section 21 calculates the acceleration caused in each of the objects from the force generated inside the object and the force externally acting on the object based on Newton-Euler mechanics using the geometric attribute and the dynamic attribute of the object stored as the three-dimensional object data, thereby performing the simulation calculation of the movement of the object. Then, it changes the position or the posture of each of the objects on the three-dimensional virtual space in accordance with the result of the forward dynamics operation. By making the changes in the position or the posture reflect on the animation, each of the objects shows realistic movement based on the principle of mechanics. As for details of the configuration of the forward dynamics operation, explanations will be presented later.

A collision detection section 22 detects a collision between each of the objects in the three-dimensional object data, and calculates an aggregate of the collision points on the surface of the object. The collision detection algorism is not particularly limited in realizing the embodiment of the invention, but the collision between the objects can calculate using, for example, a contact shape calculation method described in the specification of Japanese Patent Application No. 2005-289598, which has already been assigned to the applicant of the present patent application.

A collision force calculation section 23 calculates the external force acting on the collision point obtained by the collision detection section 22. Regarding the calculation method of the collision force, the collision force can be determined using, for example, the operational space physical quantity and a linear complementarity problem, which will be described later in detail.

Figure 3:
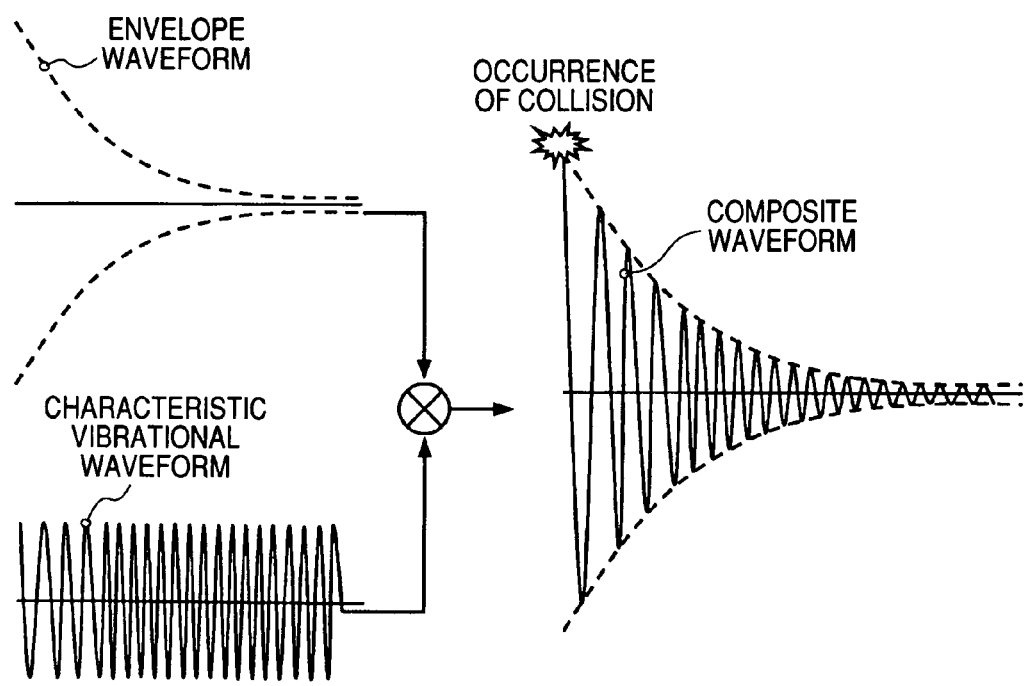
FIG. 3 is a diagram for explaining a mechanism of forming an impact noise output from a colliding object from a waveform obtained by combining a characteristic vibration waveform of the object and an envelope waveform.

It is assumed that the object to which the collision force or other external force is applied outputs the impact noise based on the characteristic vibration waveform inherent in the object and the volume of the impact noise including the characteristic vibration waveform is damped in accordance with the elapsed time from the occurrence of the collision. The damping characteristics and the characteristic vibration waveform are included in the three-dimensional object data as the vibrational attribute of the object (described above). Further, as shown in FIG. 3, the waveform obtained by combining the characteristic waveform of the object and an envelope waveform becomes the impact noise output from the colliding object.

In the present embodiment, an envelope waveform calculation section 24 calculates the envelope waveform of the sound effects in accordance with the mechanical quantity such as the external force or the change in velocity of the object obtained by the collision force calculation section 23 with respect to every object whose collision is detected by the collision detection section 22. As shown in FIG. 3, the envelope waveform is a waveform dominating the volume of the sound effects and the absolute value thereof becomes large in the case in which a large collision occurs. The degree of its damping is determined by a method described later besides the vibrational attribute of each of the objects in the three-dimensional object data described above. As described above, generation of the sound effects with the physical basis can efficiently be performed by making the result of the dynamic computation reflect on the envelope waveform. Therefore, by using the result of the mechanical simulation by the forward dynamics operation section 21, synergistic effects of achieving the realistic movement of the object based on the principle of mechanics and enhancement of the virtual reality can be expected.

A characteristic vibration waveform setting section 25 sets the characteristic vibration waveform with respect to all of the collisions. The characteristic vibration waveform of each of the objects corresponds to the tone output by the object. As shown in FIG. 3, the characteristic vibration waveform has a higher frequency than the envelope waveform, and calculation thereof based on the physical model requires a large calculation amount. Therefore, it is assumed in the present embodiment that the vibrational attribute data of each of the objects is registered as one of static characteristic vibration data. For example, a metallic object is arranged to hold a characteristic vibration waveform of metal, and a plastic object is arranged to hold a characteristic vibration waveform of plastic, as the vibrational attribute of each of the objects. The characteristic vibration waveform setting section 25 sets the characteristic vibration waveform regarding the collision based on the vibrational attribute held in each of these objects in the three-dimensional object data.

As described above, the sound generated in accordance with the collision of the object is determined by the envelope waveform and the characteristic vibration waveform of the object. Therefore, in the present embodiment, a combination of the envelope waveform set by the envelope waveform calculation section 24 and the characteristic vibration waveform set by the characteristic vibration waveform setting section 25 are treated as the generated sound information. A generated sound list management section 26 registers the generated sound information, which is obtained sequentially, in a past generated sound list as a past sound. Further, since the volume of the impact noise decreases along the envelope waveform in accordance with the elapsed time from the collision of the objects, and becomes too soft to hear before long, it performs a process for removing the past enough generated sound information from the past generated sound list.

The sound effect generated by the individual collision is obtained from the composite wave of the envelope waveform and the characteristic waveform. The envelope waveform calculation section 24 calculates the envelope waveform in accordance with the collision force obtained by the collision force calculation section 23. Since the collision force calculation section 23 is capable of calculating the collision force at high-speed by a method based on the mechanical simulation, the envelope waveform can be calculated in real time. That is, since it becomes possible to output the realistic sound effects in real time, presence can be provided to the three-dimensional virtual space.

A generated sound composition section 27 performs composition of the envelope waveform and the characteristic vibration waveform based on the generated sound information registered in the past generated sound list to obtain the generated sound caused by every object collision, and then overlaps all of these generated sounds on the time axis to calculate the generated sound in the three-dimensional virtual space at the current time. As described above, since the generated sound list management section 26 removes the generated sound information, which has become too soft to hear with enough time elapsed from the collision, the generated sound composition section 27 need not perform an unnecessary sound composition process.

A sound output section 28 converts the composite waveform obtained by the generated sound composition section 27 into a drive signal of the loud speaker, and outputs the signal as the sound effects of the object, which has caused an interaction on the three-dimensional virtual space.

It should be noted that the three-dimensional virtual space presentation device 100 according to the present embodiment can present the force regarding the interaction of the object to the user through the haptic device 106 using the result of the mechanical simulation by the forward dynamics operation section 21 for obtaining the physical quantity regarding the collision between the objects. It should also be noted that since the force presentation is not directly related to the scope of the invention, the description therefor will be omitted in the specification.

Real Time Collision Force Calculation Using Mechanical Simulation

Since the three-dimensional virtual space presentation device according to the present embodiment calculates the envelope waveform of the sound effects based on the mechanical quantity such as the collision force obtained by utilizing the result of the mechanical simulation, it can generate the sound effects with the physical basis and presence by multiplying the characteristic vibration waveform of the colliding object by the envelope waveform. Further, it realizes the real time generation of the realistic sound effects by implementing the high speed mechanical simulation method capable of calculating the collision force. The configuration method of the forward dynamics operation FWD and the calculation method of the collision force using the mechanical simulation will hereinafter be described in detail.

There is an important concept called "operational space" in many fields such as force control, a mechanical simulation, computer animation, posture editing, or external force estimation. The operational space denotes a space for describing the relationship between the force acting on the object and the acceleration caused there from. The operational space is basically provided by a matrix called an inverse operational space inertia matrix, and is able to obtain an expression method for tying the force and the acceleration with each other.

The relational expression between the acceleration and the force in the operational space can be described using the operational space physical quantity such as the inverse operational space inertia matrix or operational space bias acceleration. Further, it is possible to obtain the acceleration and the force satisfying the linear complementarity problem consisting of conditions of constraint imposed when a physical interaction such as a collision between the objects using the inverse operational space inertia matrix and operational space bias acceleration, and to determine the mechanical quantity such as the collision force acting on the object, and further the velocity, acceleration, impulse, or energy based on the obtained force.

In this case, since the calculation along the definition requires vary large calculation amount for calculating the inverse operational space inertia matrix, it is problematically unsuitable for the real time processing. Therefore, in the present embodiment, a mechanical model for determining the behavior of the object existing in the three-dimensional virtual space based on-physics is used for performing the forward dynamics operation FWD for obtaining generalized acceleration from generalized force, thereby calculating the inverse operational space inertia matrix and the operational space bias acceleration at high speed.

For example, it is known that the dynamic equation of the whole link structure such as a CG character composed of a plurality of rigid bodies linked one another can be expressed with a form as a formula (1) described below.

$$\tau = H\ddot{q} + b - J^T f \qquad (1)$$

In the formula, $\tau$ denotes generalized force corresponding to a generalized variable q, b denotes gravity/Coriolis force, f denotes external force acting on the operational space, H denotes an inertia matrix to a joint coordinate space of the whole structure, and J denotes Jacobian defining the operational space. The formula (1) described above can be modified as follows.

$$\ddot{x} = \Lambda^{-1} f + c \qquad (2)$$

In this case, c denotes the operational space bias acceleration (acceleration generated in the operational space when no external force is applied), and is expressed as below.

$$c = JH^{-1}(\tau - b) + \dot{J}\dot{q} \qquad (3)$$

Further, $\Lambda^{-1}$ in the formula (2) above is a matrix called an inverse operational space inertia matrix. As described in the following formula, the inverse operational space inertia matrix is a matrix for associating the force with the acceleration in a given portion, and is an important physical quantity for allowing the applications to many fields such as force control, a mechanical simulation, computer animation, posture editing, or external force estimation.

$$\Lambda^{-1} = JH^{-1}J^T \qquad (4)$$

In the above formula (2), considering a process of obtaining the left-hand side from the right-hand side, it can be regarded as a problem for obtaining the acceleration in the operational space when external force, generalized force, gravity, or force (e.g., Coriolis force) related to velocity product is applied. Although it is different from the ordinary forward dynamics calculation in that the acceleration in the operational space is obtained, it can be regarded as a kind of forward dynamics operation. The forward dynamics operation FWD has a joint model as a mechanical model of the link structure, velocities of respective joints, joint torque $\tau$ as the generalized force, gravity g, and external force f as parameters, and can be expressed as the following formula (5). In this case, g denotes the gravity acceleration.

$$\ddot{x} = \text{FWD}(q, \dot{q}, \tau, g, f) \qquad (5)$$

According to the present forward dynamics operation FWD, the acceleration generated in each point of the link structure can be obtained from the generalized variable q corresponding to the mechanical model of the link structure and information of the force acting on the link structure, such as the generalized force $\tau$, gravity g, or the external force f. It should be noted here that, in the above formula (5), under a constrained condition in which all of the input parameters of the forward dynamics operation FWD except the generalized variable q and the external force f are set to zero, the acceleration generated in the operational space in the condition in which gravity, joint force, and the force (e.g., Coriolis force) related to the velocity product are not generated can be obtained. That is, the bias acceleration c can be set to zero in the formula (3). Further, it is understood that if the calculation is performed under the condition of $f=e_i$, namely the condition in which the unit external force is applied only to the ith operational space, the ith column of the inverse operational-space inertia matrix $\Lambda^{-1}$ can be obtained. Therefore, the whole of the inverse operational space inertia matrix $\Lambda^{-1}$ can be obtained by performing the operation of the following formula (6) for every line i.

The ith column of $\Lambda^{-1}=FWD(q,0,0,0,e_i)$ (6)

Further, the operational space bias acceleration c can be extracted as shown in the formula (7) by performing the forward dynamics operation FWD of the formula (5) under a constrained condition in which the external force f is set to zero and only the force generated in the joints, the velocity of the joints, and gravity are applied.

$c=FWD(q,\Lambda\tau,g,0)$ (7)

In conclusion, by performing the forward dynamics operation FWD combining the above formulas (6) and (7) and using the generalized variable q as the mechanical model, the inverse operational space inertia matrix $\Lambda^{-1}$ and the operational space bias acceleration c, which are important physical quantities in the operational space can be obtained.

The calculation method of the inverse operational space inertia matrix described above is effective for the case in which a plurality of objects exists in the virtual environment, and the mechanical simulation for reproducing the physical interaction such as a collision or a contact between them on the computer is performed in real time, or the object therein is handled. The dynamic computation of the mechanical simulation can be performed by applying the force between the bodies to the forward dynamics operation FWD.

Figure 4:
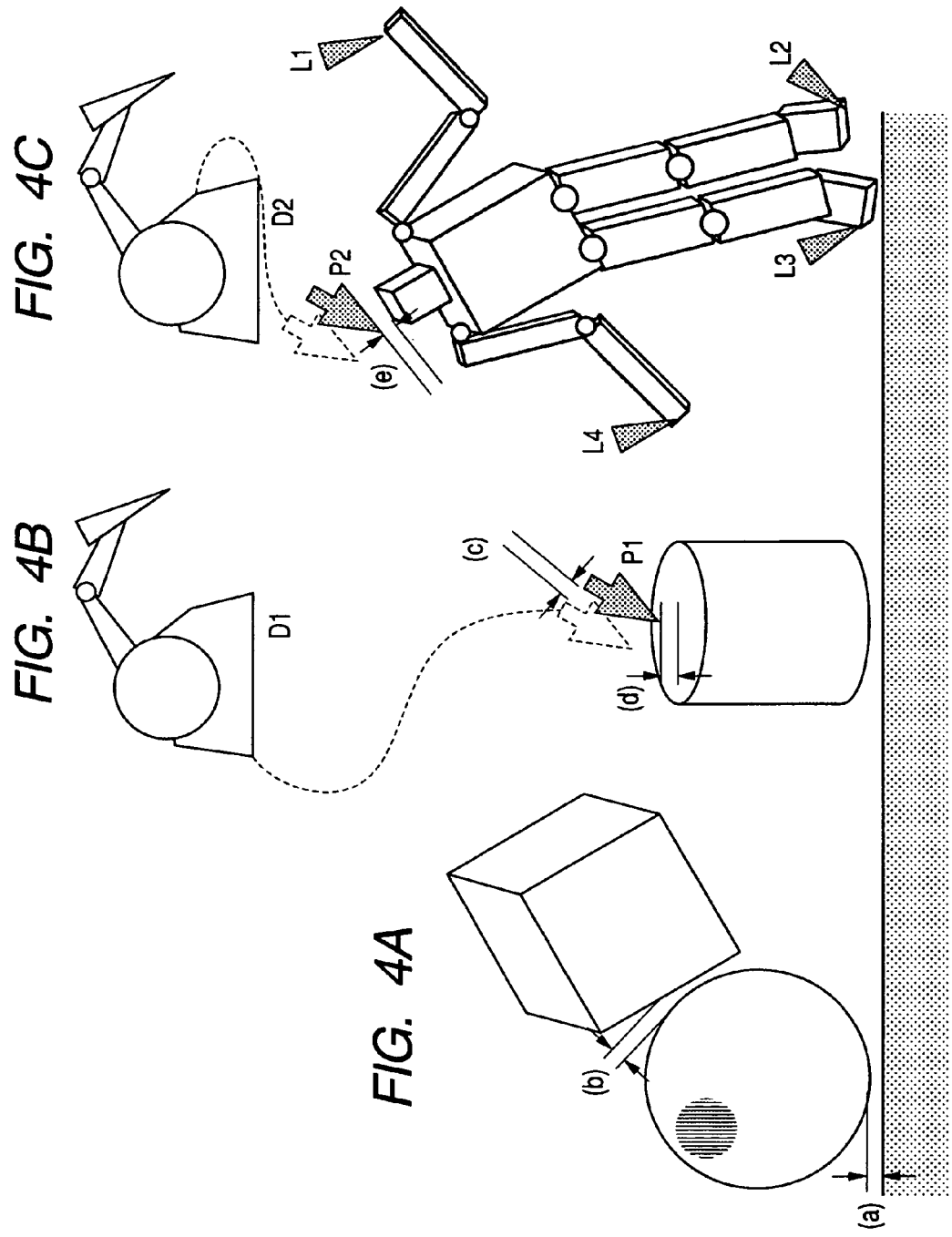
FIGS. 4A through 4C are diagrams each showing a condition in which a physical interaction such as a collision or a contact is applied between bodies.

FIGS. 4A through 4C exemplify conditions in which a physical interaction such as a collision or a contact is applied between bodies. In FIG. 4A, there are detected collisions between the virtual objects at positions denoted with (a) and (b) in the drawing. In this case, the external force can be determined by solving the linear complementarity problem described in the following formulas (8) through (10) so as to realize the repulsion with a designated restitution coefficient and appropriate friction between the bodies.

$\ddot{x}=\Lambda^{-1}f+c$ (8)

$f_{N_i}\geq 0, \ddot{x}_{N_i}\geq 0$ and $f_{N_i}\ddot{x}_{N_i}=0$ (9)

$|f_{F_i}|\leq \mu_i f_{N_i}, f_{F_i}\ddot{x}_{N_i}\leq 0$ and $\ddot{x}_{F_i}(\mu_i f_{N_i}-|f_{F_i}|)=0$ (10)

In this case, $f_{N_i}$ and $f_{F_i}$ respectively existing in the above formulas (9) and (10) respectively represent the external force and the frictional force in the normal direction at the working point i caused by the restrictions applied to the object having contact with the external world. The symbol $\mu_i$ denotes a frictional coefficient in the working point i.

The above formulas (8) through (10) are called a linear complementarity problem. Further, if the inverse operational space inertia matrix $\Lambda^{-1}$ and the bias acceleration c are known, the acceleration of x and the force f satisfying them can be determined by solving this linear complementarity problem. The mathematical solution of the linear complementarity problem itself is described in, for example, "Fast Contact Force Computation for Nonpenetrating Rigid Bodies" (SIGGRAPH 94, pp.23-34, 1994), and accordingly, the explanation therefor will be omitted here.

By setting the operational space at the portions (a) and (b), at which the objects collide, in the acting direction of the vertical reacting force and the friction force, and calculating the inverse operational inertia matrix $\Lambda^{-1}$ and the bias acceleration c at high speed using the method explained above, the external force can be obtained precisely and in a short period of time. Therefore, it becomes possible to perform a sophisticated mechanical simulation in real time even in a complicated environment.

Further, FIG. 4B shows an example configured so that the haptic device D1 is connected to such a real time mechanical simulation environment, the position of the object P1 (proxy) in the virtual environment is changed in accordance with the position of the tip of the haptic device D1, and the force acting on the object P1 is fed back to the haptic device D1.

In this case, in order for according the position of the object P1 with the instructed position of the haptic device D1, the operational space (c) is set with respect to the relative position error. Further, similarly to the case shown in FIG. 4A, the operational space (d) is set in the acting direction of the vertical reacting force and the frictional force with respect to the collision between the object P1 and another object. These restrictions are also formulated as the linear complementarity problem described as the above formulas (8) through (10). Even the inverse operational space inertia matrix $\Lambda^{-1}$, which has the largest calculation amount of this configuration, can also be calculated in real time by the method according to the present embodiment, making it possible to precisely reproduce the feeling of touching the body existing in the virtual environment on the haptic device D1 in real time.

Further, in addition to the configuration shown in FIG. 4B, FIG. 4C shows a configuration in which a restriction (L1 through L4) regarding a position or a posture can be applied to various positions of the object (e.g., a humanoid character) in the virtual space.

The restriction of the position or the posture can be expressed with the equality condition as described in the formula (8). It is enough to set the operational spaces at the positions to which the restriction of the position or the posture is set in three directions parallel to the world coordinate. Further, if such a restriction regarding the position or the posture is applied to the relative position or the posture between the object P2 and the body to set the operational space (e) here, the reactive force caused by the pulling or twisting operation in the virtual environment can also be sensed in a sophisticated manner by feeding back to the haptic device D2 the force acting on the object P2 caused when a predetermined part of the body existing in the virtual space is pulled or twisted using the haptic device D2.

These problems can also be formulated using the operational space, and restored to the linear complementarity problem described with the above formulas (8) through (10). Although in the configuration shown in FIG. 4C a portion with the largest calculation amount becomes the inverse operational space inertia matrix $\Lambda^{-1}$, it can be calculated in real time according to the calculation method described above. Therefore, for example, the user becomes to be able to perform the motion control or the posture editing of the character while feeling in real time the similar force to one felt in the case in which the user edits the posture while touching the real body. Further, by editing the posture based on the force, unstable behavior around the singular point, which is often observed in the inverse kinematics, can also be removed.

Automatic Sound Effect Generation Based On Mechanical Quantity

The three-dimensional virtual space presentation device 100 according to the present embodiment configures the envelope waveform enveloping the vibration waveform of the sound effects from the result of the mechanical simulation, and combines it with the characteristic vibration waveform inherent in the colliding object, thereby generating realistic sound effects provided with the physical basis. The calculation method will be described in detail here.

The collision detection section 22 detects a collision between the objects occurring in the three-dimensional object data, and calculates an aggregate of the collision points on the surface of the object. Further, the collision force calculation section 23 calculates the collision force acting on each of the collisions i detected by the collision detection section 22 by applying the mechanical simulation (as described above).

The envelope waveform calculation section 24 calculates the envelope waveform of the sound effects in accordance with the physical quantity obtained by the collision force calculation section 23 with respect to each of the collisions i detected by the collision detection section 22. Assuming that the collision i occurs at a time point t=0, the envelope waveform $E_i(t)$ of the sound caused by the collision is thought to be expressed as an impulse waveform as follows.

$$E_i(t) = E_{0i} \exp(-A\lambda_i t) \tag{11}$$

In the above formula, $E_{0i}$ is a rising volume of the sound caused by the collision i, and the envelope waveform calculating section 24 determines this value so as to correspond to the strength of the collision calculated by the collision force calculation section 23, thus the reality of the sound effects caused by the collision or the contact can be enhanced. Further, $\lambda_i$ is a parameter representing attenuation state of the sound, and is stored as the vibrational attribute (described above) of the three-dimensional object data. Defining the attenuation parameters of the two bodies causing the collision i as $\lambda_{1i}$ and $\lambda_{2i}$, the attenuation parameter of the collision i can be assumed as the average thereof as the following formula.

$$\lambda_i = (\lambda_{1i} + \lambda_{2i})/2 \tag{12}$$

Further, how large is the sound caused by the collision is closely related to the strength of the collision force. Therefore, as described in the following formula, the value obtained by multiplying the collision force $f_i$ caused by the collision i by an appropriate gain $K_i$ can be set as the rising volume.

$$E_{0i} = K_i f_i \tag{13}$$

The characteristic vibration waveform setting section 25 sets the characteristic vibration waveform with respect to each collision i. The characteristic vibration waveform of each of the objects corresponds to the tone output by the object. Defining the characteristic vibration waveforms of the two bodies causing the collision i as $I_{1i}(t)$, $I_{2i}(t)$, respectively, the characteristic vibration waveform $I_i(t)$ caused by the collision i can be assumed as the average thereof as described in the following formula.

$$I_i(t) = (I_{1i}(t) + I_{2i}(t))/2 \tag{14}$$

The generated sound with respect to the collision i is determined by the envelope waveform $E_i(t)$ and the characteristic vibration waveform $I_i(t)$. Assuming that the characteristic vibration waveform $I_i(t)$ described in the above formula is normalized, the sound wave $S_i(t)$ caused by the collision i becomes as follows.

$$S_i(t) = E_i(t) I_i(t) \tag{15}$$

In the present embodiment, a group of the envelope waveform $E_i(t)$ and the characteristic vibration waveform $I_i(t)$ is treated as the generated sound information for composing the sound generated in accordance with the collision between the objects in the virtual space, and the generated sound list management section 26 registers the generated sound information obtained sequentially in the past generated sound list as the past sound.

Figure 5:
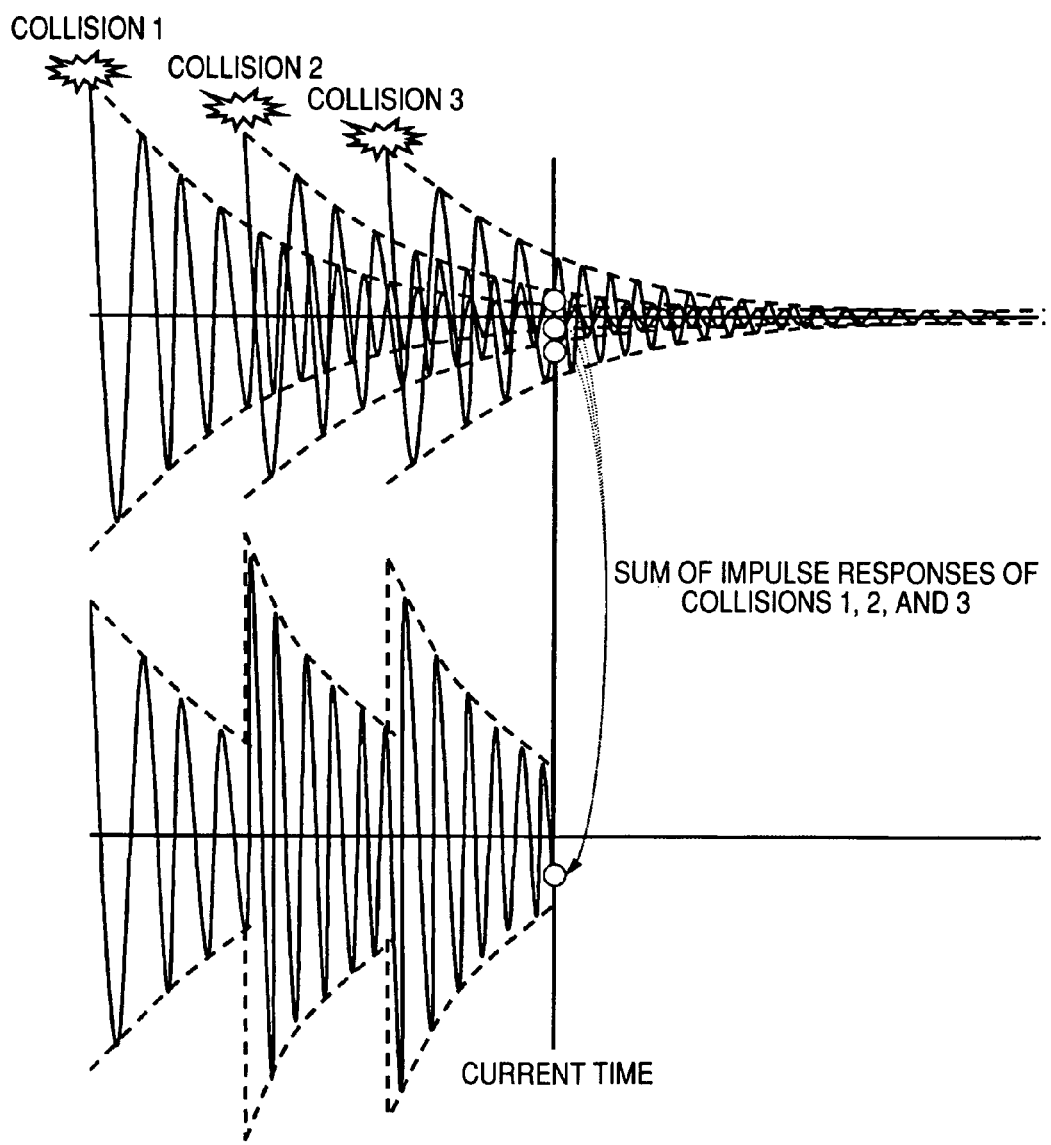
FIG. 5 is a diagram showing a condition in which impulse responses each corresponding to an individual collision are combined on the time axis.

The sound S(t) at a time point t can be considered as a sum of the impulse responses of all of the collisions caused in the past. FIG. 5 shows the condition in which the impulse responses each corresponding to an individual collision are combined on the time axis. That is, assuming that the time $t_i$ has elapsed from the occurrence of the collision i, the sound S(t) is expressed as the following formula.

$$S(t) = \sum_{i \in all\ past\ collisions} \tag{16}$$

$$S_i(t_i) = \sum_{i \in all\ past\ collisions} E_{0i} \exp(-\lambda_i t_i) I_i(t_i)$$

In fact, the volume of the impact noise reduces along the envelope waveform as the time elapses from the collision of the objects, and the impact sound becomes too soft to hear before long. Accordingly, there is no need for tracing all the past time, but it is sufficient to perform the calculation along the above formula (16) with respect to the collisions in a limited time range capable of substantially affecting the sound at present. Therefore, the generated sound list management section 26 performs the process of excluding the past generated sound having the envelope waveform sufficiently attenuated. The generated sound composition section 27 subsequently performs composition of the envelope waveform and the characteristic vibration waveform based on the generated sound information registered in the past generated sound list to obtain the generated sound caused by every object collision, and then overlaps all of these generated sounds on the time axis to calculate the generated sound in the three-dimensional virtual space at the current time.

By generating the sound effects in the three-dimensional virtual space along the procedure described above, it becomes possible to provide the sound effects such as an impact noise or the friction noise in a realistic condition including the texture of the sound. Further, if the vibrational attributes of all of the objects are the same, the formula (16) can be simplified as the following recurrence formula. Here, $\Delta t$ represents an execution cycle of the present operation.

$$E(t) = \exp(-\lambda \Delta t) E(t - \Delta t) + \Sigma_{i \in all\ collisions\ at\ t} E_{0i}$$

$$S(t) = E(t) I(t) \tag{17}$$

Therefore, it can be configured so as to reduce the calculation amount in comparison with the formula (16) by performing the calculation along the above formula (17) for every collision presenting the same vibrational attribute.

FIG. 6 shows the process procedure for composing the sound effects caused by the collision or the contact of the objects in the three-dimensional virtual space presentation device 100 according to the present embodiment in the form of a flowchart. The process procedure is realized in the form in which the CPU 101 executes a predetermined program.

Firstly, the collision detection section 22 detects the collision of each of the objects in the three-dimensional object data to calculate the aggregate of the collision points (step S1).

Subsequently, the collision force calculation section 23 calculates the external force acting on every collision point (step S2).

Subsequently, the forward dynamics operation section 21 performs the forward dynamics operation, and advances time by a minute period of time, thus updating the positions or the postures of the three-dimensional objects (step S3).

The envelope waveform calculation section 24 sets the envelope waveform of the impact noise generated in accordance with each of the collisions (step S4). The rising value of the envelope waveform is provided by the formula (13), and the damping characteristics thereof can be provided by the formula (12). The both values are stored as the parameters defining the envelope waveform.

The characteristic vibration waveform setting section 25 sets the characteristic vibration waveform of the impact noise generated in accordance with each of the collisions (step S5). Since the characteristic vibration waveform of the impact noise caused by the collision between the two objects is provided by the formula (14), a pointer to the characteristic vibration waveform stored in the vibrational attribute of each of the two relevant objects in the three-dimensional object data is stored.

Subsequently, the generated sound information stored respectively in the steps S4 and S5 is stored as a structure, and registered in the past generated sound list as the generated sound information (step S6).

The process from the step S4 through the step S6 is executed for every collision point detected by the collision detection section 22 in the step S1.

Subsequently, the process of excluding the generated sound information registered in the past generated sound list and having the value of the envelope waveform smaller than a sufficiently small threshold value at that moment is performed (step S7). Thus, it becomes that only the generated sound capable of affecting the present sound can be reflected in the sound effect generation process described below.

Subsequently, the generated sound composition section 27 performs the calculation for combining the envelope waveform $Ei(t)$ and the characteristic vibration waveform $Ii(t)$ of the past sound, and for overlapping all of the past sounds $Si(t)$ based on the above formula (16) to calculate the present generated sound (step S8).

Then, the sound output section 28 converts the sound calculated in the step S8 into the drive signal for the loud speaker 104 to output it from the loud speaker 104 (step S9).

As described above, it becomes possible to generate the realistic sound effects based on the result of the mechanical simulation by repeatedly performing the process of steps S1 through S9.

As described above, the invention is described in detail with reference to a specific embodiment. However, it is obvious that those skilled in the art can perform modifications and alterations of the above embodiment within the scope of the invention.

In the present specification, the explanations are presented focusing on the embodiment in which the collisions or other physical interactions between the objects in the three dimensional virtual space are calculated using the mechanical simulation to generate realistic sound effects based on the mechanical quantity thus obtained. However, the scope of the invention is not limited to this embodiment, but with respect to the motion or the tactile impression of the body causing the physical interaction, a realistic feed back to the user can also be realized in real time based on the mechanical quantity obtained by the mechanical simulation in a similar manner.

In conclusion, the invention is disclosed above as a form of an exemplification, and accordingly, the descriptions in the present specification should not be interpreted in a restrictive manner. The appended claims should be referred to in order for determining the scope of the invention.

What is claimed is:

1. A sound effect generation device for generating a sound effect corresponding to a physical interaction between objects in a virtual space in which a plurality of virtual objects coexists, the device comprising:
   an interaction detector for detecting an object on which the physical interaction occurs in the virtual space;
   a mechanical quantity calculator for calculating a mechanical quantity acting on the object in accordance with the interaction using a mechanical model for determining, based on physics, behavior between the objects on which the physical interaction acts; and
   a sound effect generator for generating the sound effect caused in the object by the interaction using the calculated mechanical quantity, wherein the sound effect generator produces the sound effect based on an envelope waveform having an amplitude corresponding to the value of the calculated mechanical quantity and an attenuation parameter corresponding to a combination of damping attributes of the objects on which the physical interaction acts.

2. The sound effect generation device according to claim 1 further comprising
   a three-dimensional object data holder for holding data regarding a vibrational attribute including damping characteristics and a characteristic vibration waveform of a sound effect inherent in each of the objects,
   wherein the sound effect generator calculates the sound effect by combining the envelope waveform with the characteristic vibration waveform inherent in each of the objects.

3. The sound effect generation device according to claim 1 further comprising
   a generated sound list management section that registers information of each of the sound effects, generated every physical interaction as a past sound, and
   wherein a sound on the virtual space at the current time is calculated by calculating a sum of the past sounds registered in the generated sound list management section on a time axis.

4. The sound effect generation device according to claim 3, wherein the generated sound list management section performs a process of excluding the past sound, which is sufficiently damped, from the generated sound list.

5. The sound effect generation device according to claim 1, wherein one of a collision and a contact between the objects in the virtual space is handled as the physical interaction, and
   the mechanical quantity calculator calculates at least one of collision force, velocity, acceleration, impulse, and energy as the mechanical quantity acting on the object in accordance with the physical interaction.

6. A sound effect generation device for generating a sound effect corresponding to a physical interaction between objects in a virtual space in which a plurality of virtual objects coexists, the device comprising:
   an interaction detector for detecting an object on which the physical interaction occurs in the virtual space;
   a mechanical quantity calculator for calculating a mechanical quantity acting on the object in accordance with the interaction using a mechanical model for determining, based on physics, behavior between the objects on which the physical interaction acts wherein the mechanical quantity calculator includes:
   a forward dynamics operator for performing a forward dynamics operation for obtaining acceleration generated in the object based on external force caused by the physical interaction, and
   an operational space physical quantity calculator for obtaining an inverse operational space inertia matrix and operational space bias acceleration by making the forward dynamics operation means perform the forward dynamics operation using the mechanical model, and calculates the mechanical quantity acting on the object based on the force calculated by obtaining a relational expression between acceleration and force of the operational space described using the inverse operational space inertia matrix and the operational space bias acceleration, and acceleration and force satisfying a linear complementarity problem composed mainly of a condition of constraint applied when a physical interaction acts between the objects, using the inverse operational space inertia matrix and the operational space bias acceleration obtained by the operational space physical quantity calculator; and a sound effect generator for generating the sound effect caused in the object by the interaction using the calculated mechanical quantity.

7. A sound effect generation method of generating a sound effect corresponding to a physical interaction between objects in a virtual space in which a plurality of virtual objects coexists, comprising the steps of:

detecting an object on which the physical interaction occurs in the virtual space;

calculating a mechanical quantity acting on the object in accordance with the interaction using a mechanical model for determining, based on physics, behavior between the objects on which the physical interaction acts; and generating the sound effect caused in the object by the interaction using the calculated mechanical quantity, wherein the sound effect is based on an envelope waveform having an amplitude corresponding to the value of the calculated mechanical quantity and an attenuation parameter corresponding to a combination of damping attributes of the objects on which the physical interaction acts.

8. The sound effect generation method according to claim 7 further comprising the step of:

holding data regarding a vibrational attribute including damping characteristics and a characteristic vibration waveform of a sound effect inherent in each of the objects, wherein in the step of generating the sound effect, the sound effect is calculated by combining the envelope waveform with the characteristic vibration waveform inherent in each of the objects.

9. The sound effect generation method according to claim 7 further comprising the step of:

registering information of each of the sound effects generated every physical interaction as a past sound, wherein a sound on the virtual space at the current time is calculated by calculating a sum of the past sounds registered as the generated sound list on a time axis.

10. The sound effect generation method according to claim 9 further comprising the step of:

excluding the past sound, which is sufficiently damped, from the generated sound list.

11. The sound effect generation method according to claim 7, wherein one of a collision and a contact between the objects in the virtual space is handled as the physical interaction, and in the step of calculating mechanical quantity, at least one of collision force, velocity, acceleration, impulse, and energy is calculated as the mechanical quantity acting on the object in accordance with the physical interaction.

12. A sound effect generation method of generating a sound effect corresponding to a physical interaction between objects in a virtual space in which a plurality of virtual objects coexists, comprising the steps of:

detecting an object on which the physical interaction occurs in the virtual space;

calculating a mechanical quantity acting on the object in accordance with the interaction using a mechanical model for determining, based on physics, behavior between the objects on which the physical interaction acts, wherein the step of calculating mechanical quantity includes the steps of performing a forward dynamics operation for obtaining acceleration generated in the object based on external force caused by the physical interaction, and obtaining an inverse operational space inertia matrix and operational space bias acceleration by making the forward dynamics operation be performed in the step of performing a forward dynamics operation using the mechanical model, and in the step of calculating mechanical quantity, a relational expression between acceleration and force of the operational space described using the inverse operational space inertia matrix and the operational space bias acceleration, and acceleration and force satisfying a linear complementarity problem composed mainly of a condition of constraint applied when a physical interaction acts between the objects are obtained using the inverse operational space inertia matrix and the operational space bias acceleration obtained in the step of obtaining an inverse operational space inertia matrix and operational space bias acceleration, and the mechanical quantity acting on the object is calculated based on the obtained force; and generating the sound effect caused in the object by the interaction using the calculated mechanical quantity.

13. A non-transitory computer-readable medium for storing instructions for causing a processor to perform operations for generating a sound effect corresponding to a physical interaction between objects in a virtual space in which a plurality of virtual objects coexists the operations comprising:

detecting an object on which the physical interaction occurs in the virtual space;

calculating a mechanical quantity acting on the object in accordance with the interaction using a mechanical model for determining, based on physics, behavior between the objects on which the physical interaction acts; and generating the sound effect caused in the object by the interaction using the calculated mechanical quantity, wherein the sound effect is based on an envelope waveform having an amplitude corresponding to the value of the calculated mechanical quantity and an attenuation parameter corresponding to a combination of damping attributes of the objects on which the physical interaction acts.

* * * * *